United States Patent
Breese et al.

(10) Patent No.: US 6,695,337 B1
(45) Date of Patent: Feb. 24, 2004

(54) PIVOTAL PIN LOCK FOR FIFTH WHEEL HITCH

(76) Inventors: Ralph L. Breese, 5504 Pioneer Cir., Norman, OK (US) 73072; Michael C. Dunbar, 2939 NW. Sterling, Norman, OK (US) 73072

( * ) Notice: Subject to any disclaimer, the term of this patent is extended or adjusted under 35 U.S.C. 154(b) by 0 days.

(21) Appl. No.: 10/453,078

(22) Filed: Jun. 3, 2003

(51) Int. Cl.$^7$ ............................................... B62D 53/06
(52) U.S. Cl. ..................... 280/433; 280/432; 280/508
(58) Field of Search ............................. 280/432, 433, 280/434, 435, 436, 437, 438.1, 441.1, 508

(56) References Cited

U.S. PATENT DOCUMENTS

| | | | | |
|---|---|---|---|---|
| 3,811,706 A | * | 5/1974 | Tucker et al. | ............... 280/407 |
| 4,928,987 A | * | 5/1990 | Hunger | ........................ 280/435 |
| 5,839,745 A | * | 11/1998 | Cattau et al. | ............... 280/434 |
| 6,170,850 B1 | * | 1/2001 | Works | ........................ 280/433 |
| 6,491,317 B1 | | 12/2002 | Breese | |
| 6,547,270 B1 | | 4/2003 | Breese | |
| 6,554,310 B2 | * | 4/2003 | Babin | ..................... 280/441.1 |

FOREIGN PATENT DOCUMENTS

| | | | | |
|---|---|---|---|---|
| EP | 0319766 | * | 11/1988 | ........... B62D/53/08 |
| GB | 2128952 A | * | 5/1984 | ........... B62D/53/08 |

* cited by examiner

*Primary Examiner*—Avraham Lerner
(74) *Attorney, Agent, or Firm*—Randal D. Homburg

(57) ABSTRACT

An improvement to a fifth wheel hitch providing a pivotal pin lock to retain a kingpin of a fifth wheel trailer within a front opening of the fifth wheel hitch during the loading process prior to engaging the pin in the fifth wheel hitch, the pivotal pin lock including a ramp plate pivotally engaged with the front opening of the fifth wheel hitch by extending arms of a transverse pivot rod, the ramp plate having an upper surface upon which the pin is directed towards a catch mechanism in the fifth wheel hitch, the ramp plate blocking the front opening of the fifth wheel hitch once the pin has passed the pivotal pin lock.

3 Claims, 4 Drawing Sheets

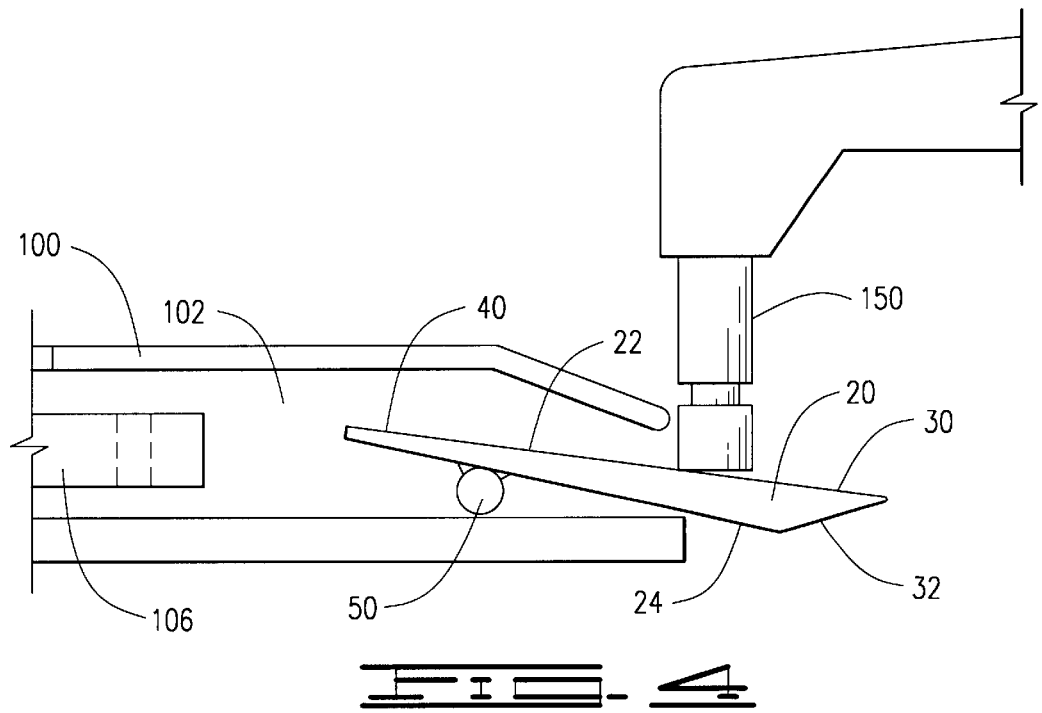
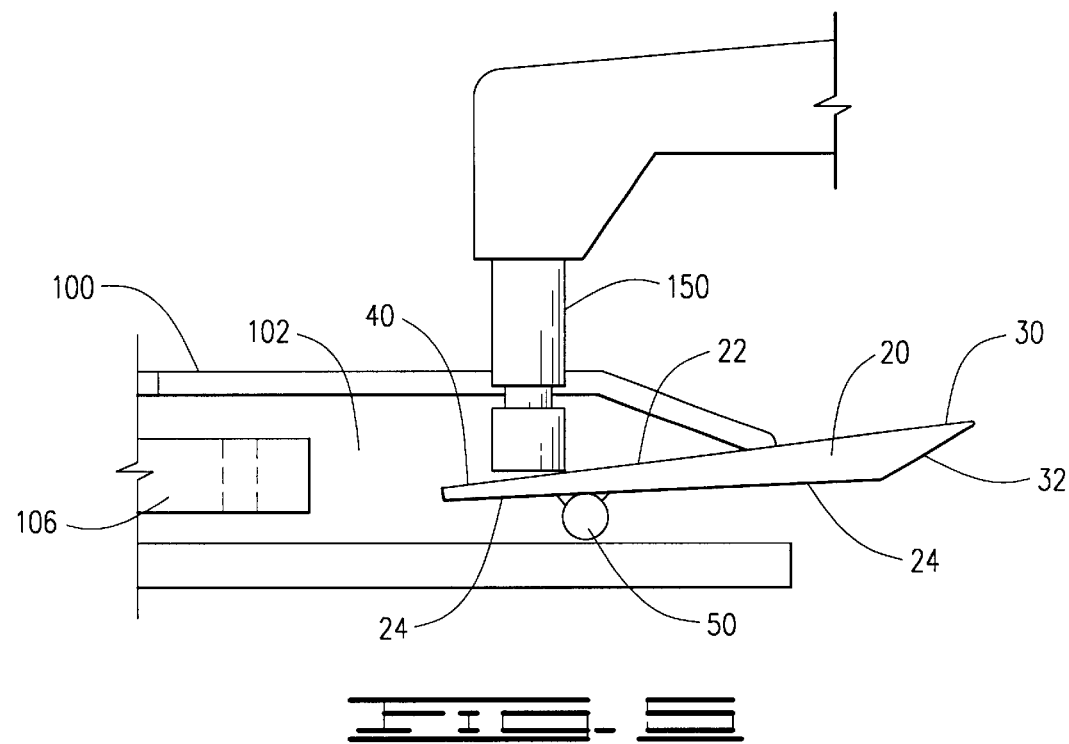

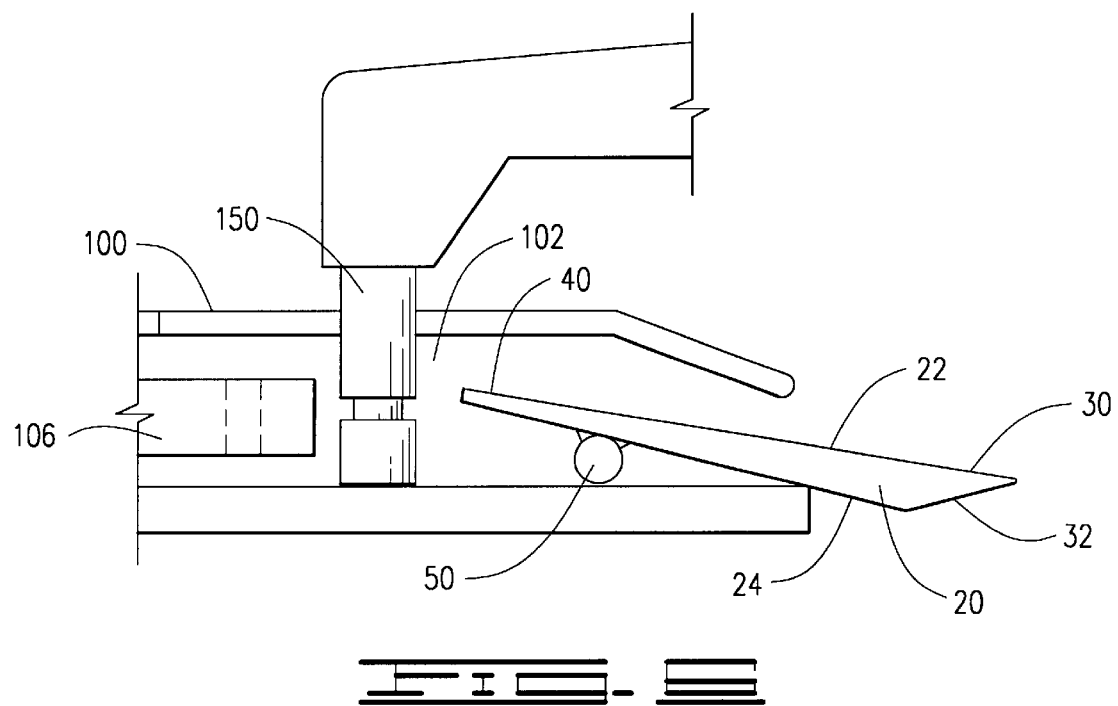

PIVOTAL PIN LOCK FOR FIFTH WHEEL HITCH

CROSS REFERENCE TO RELATED APPLICATIONS

None

I. BACKGROUND OF THE INVENTION

1. Field of Invention

An improvement to a fifth wheel hitch providing a pivotal pin lock to retain a kingpin of a fifth wheel trailer within a front opening of the fifth wheel hitch during the loading process prior to engaging the pin in the fifth wheel hitch, the pivotal pin lock including a ramp plate pivotally engaged with the front opening of the fifth wheel hitch by extending arms of a transverse pivoting rod, the ramp plate having an upper surface upon which the pin is directed towards a catch mechanism in the fifth wheel hitch, the ramp plate blocking the front opening of the fifth wheel hitch once the pin has passed the pivotal pin lock.

2. Description of Prior Art

The following United States patents were discovered and are disclosed within this application for utility patent. All relate to fifth wheel hitches and means of retaining kingpins. This inventor has two previous U.S. Patents dealing with fifth wheel hitches and catches for kingpins, U.S. Pat. No. 6,491,317 to Breese and Dunbar and U.S. Pat. No. 6,547,270 to Breese.

In '317 to Breese, a device for retaining a kingpin outside the fifth wheel hitch when the kingpin becomes accidentally disengaged from the kingpin included a bar and kingpin catch that attached to a fifth wheel hitch outside and below the opening of the fifth wheel hitch. Breese '270 dealt with a static locking bar that attached within the opening of the fifth wheel hitch to prevent the kingpin from sliding along the lower plate of the fifth wheel hitch.

The current invention provides a pivotal locking mechanism, attaching within the opening of the fifth wheel hitch, as in Breese '270, except instead of being fixed within the opening, it is pivotally engaged, providing an angled ramp which allows for the kingpin to ride up the ramp, the ramp teetering at a pivot point, providing a more elevated block to the fifth wheel hitch opening than in the inventor's prior patents. This pivotally locking device is distinguishable mainly in the pivotal ramp, being a part which moves in relation to the fifth wheel hitch as opposed to the previous devices being fixed devices.

II. SUMMARY OF THE INVENTION

Most accidents involving fifth wheel hitches occur during the loading and unloading process, which is the time that the person involved in the hitching or unhitching of the trailer from the hitch is present in the area where the injury is most likely to occur, or at the hitch itself. In addition, damage to the trailer or the pickup to which the hitch is mounted is also most likely to occur during the loading and unloading process, when the trailer and hitch are disengaging or engaging, the kingpin often being lowered during the hitching process, exiting control of the fifth wheel hitch, falling out of the hitch, and landing on the side rails or bed of the pickup causing extensive damage to the pickup.

The primary objective of the invention is to provide a pivotal safety device in the form of the pivotal locking ramp which directs a kingpin to the throat of the fifth wheel hitch for latching which, at a pivot point, causes the ramp to lower, directing the kingpin into the fifth wheel latch and pivoting upward again after the weight of the kingpin has passed, blocking the kingpin from exiting the throat of the fifth wheel hitch unless raised over the pivoting ramp.

III. DESCRIPTION OF THE DRAWINGS

The following drawings are submitted with this utility patent application.

FIG. 4 is a side view of the pivotal pin lock in a fifth wheel hitch with a kingpin on the ramp end of the ramp plate.

FIG. 5 is a side view of the pivotal pin lock in a fifth wheel hitch with a kingpin on the locking end of the pivoting ramp plate.

FIG. 6 is a side view of the pivotal pin lock in a fifth wheel hitch after the kingpin has passed the locking end of the ramp plate with the locking end blocking egress of the kingpin from the opening of the fifth wheel hitch.

IV. DESCRIPTION OF THE PREFERRED EMBODIMENT

Figure 1:
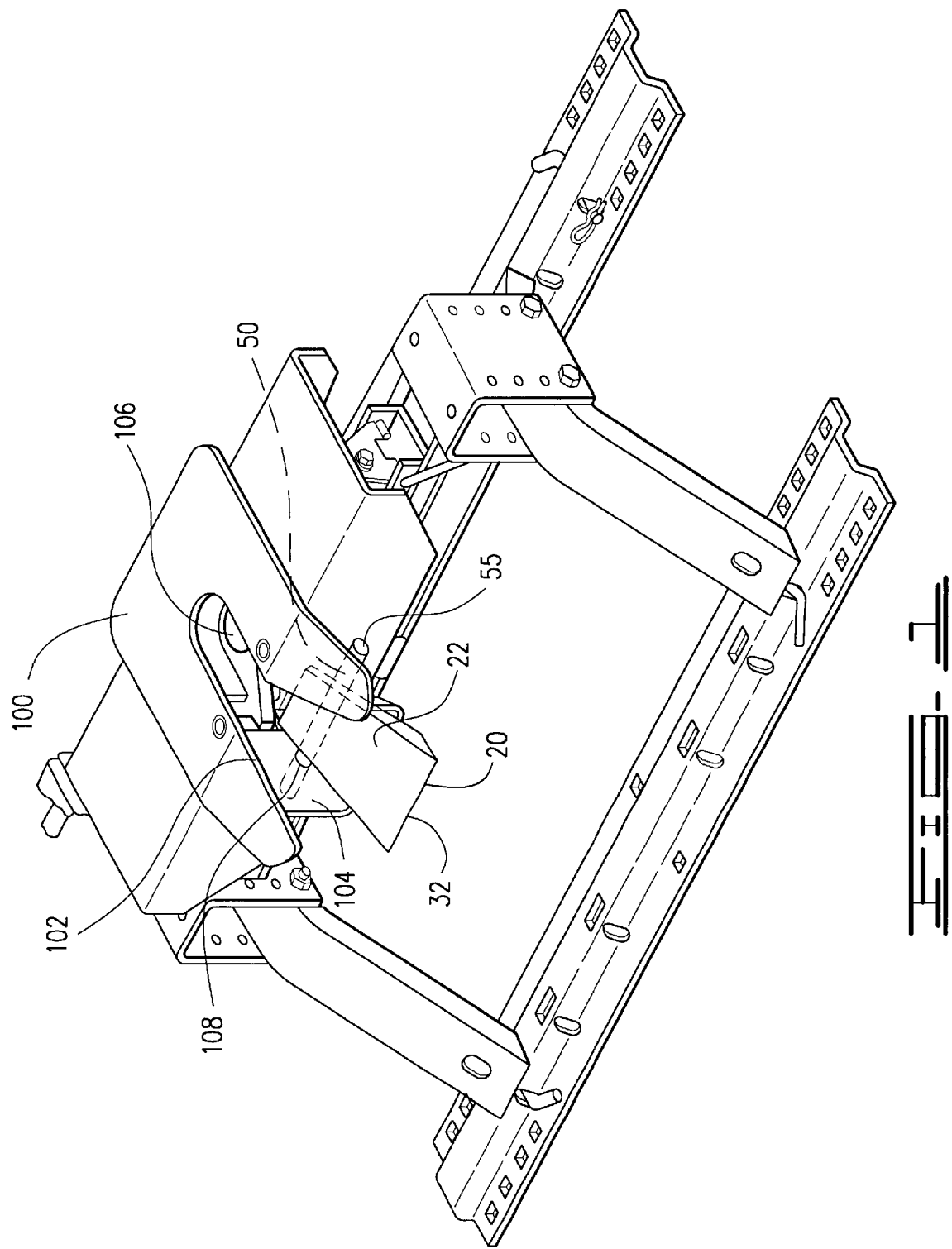
FIG. 1 is a perspective view of the pivotal pin lock installed in a fifth wheel hitch.
Figure 2:
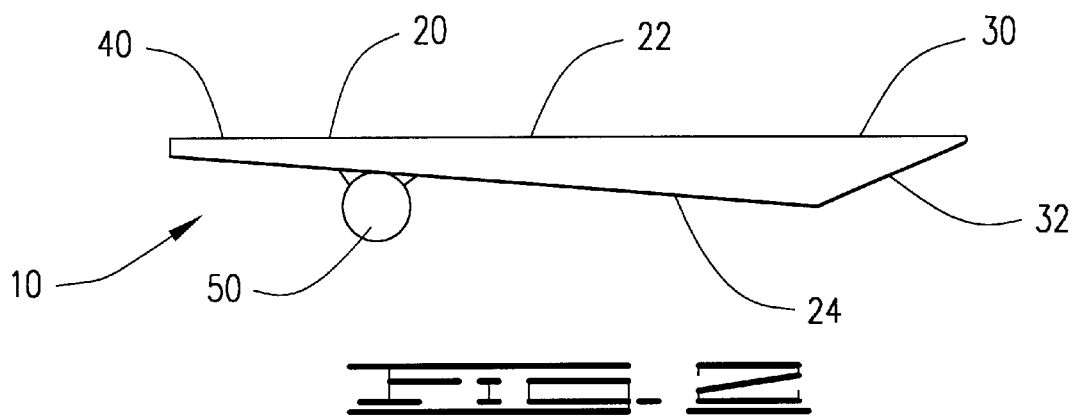
FIG. 2 is side view pivotal pin lock.
Figure 3:
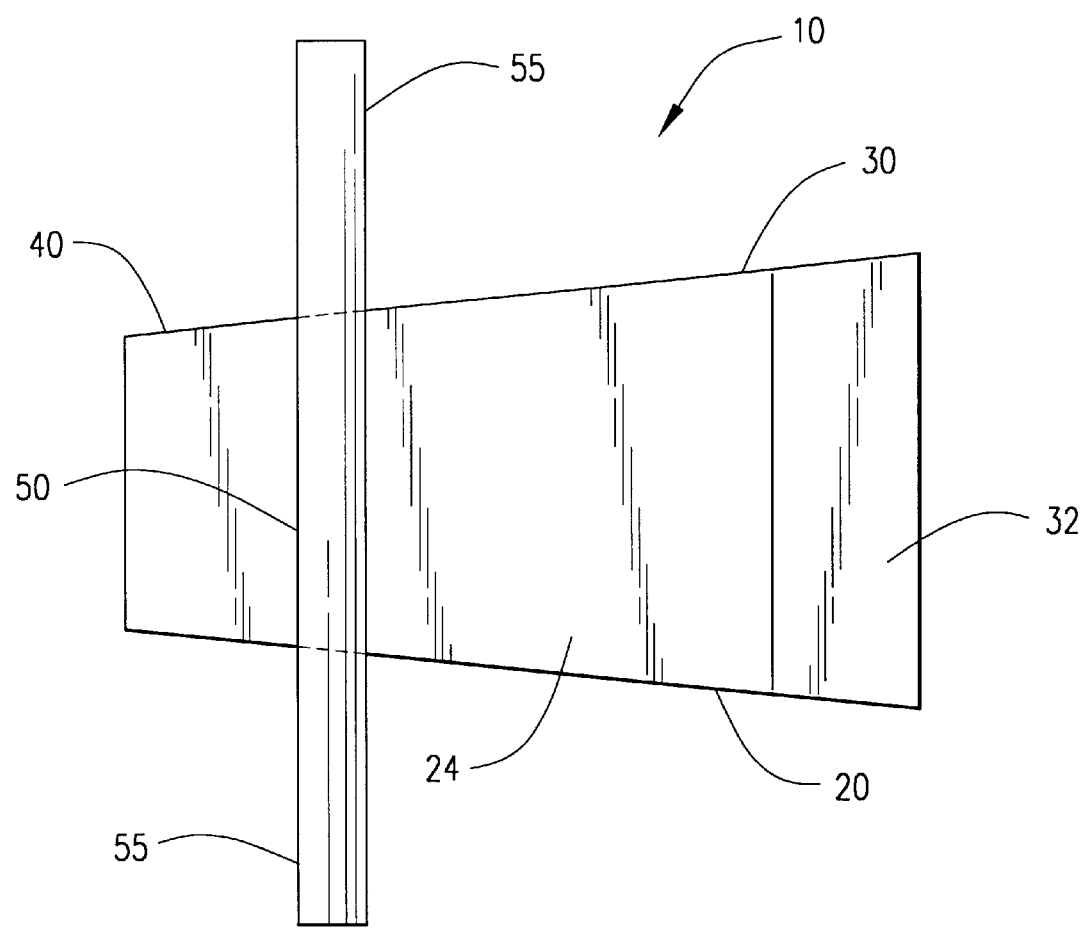
FIG. 3 is a bottom view of the pivotal pin lock.

An improvement to a fifth wheel hitch 100, shown in FIGS. 1–6 of the drawings, adapted to engage the opening 102 of a fifth wheel hitch 100 is a pivotal pin lock 10 pivotally directing a kingpin 150 from a trailer into the opening 102 of the fifth wheel hitch 100 while blocking release of the kingpin 150 from the opening 102 once the kingpin 150 passes the pivotal pin lock 10, the pivotal pin lock 10 comprising a tapered ramp plate 20 having a weighted ramp end 30 and a locking end 40, the ramp plate 20 having an upper surface 22 and a lower surface 24, the lower surface 24 having attached a transverse pivoting rod 50 forming two extending pivot arms 55, FIG. 3, the pivot arms 55 engaging side plates 104 in the opening 102 of the fifth wheel hitch 100, FIG. 1. The locking end 40 of the ramp plate 20 is directed towards a locking mechanism 106 of the fifth wheel hitch 100 with the weighted ramp end 30 directed away from the locking mechanism 106, the ramp end 30 presenting lower than the locking end 40 in an idle state. The upper surface 22 of the ramp plate 20 defines an incline, with the ramp end 30 lower than the locking end 40 as the kingpin 150 begins contact with the upper surface 22, FIG. 4, guiding the kingpin 150 of the fifth wheel trailer up the ramp end 30 until the kingpin 150 moves onto the locking end 40, tipping the ramp plate 20, FIG. 5, lowering the locking end 40 and raising the ramp end 30. Once the kingpin 150 passes the locking end 40 of the ramp plate 20, the ramp plate 20 returns to a position with the ramp end 30 lower than the locking end 40, the locking end 40 preventing the kingpin 150 from being removed from the opening 102 past the ramp plate 20 unless raised, FIG. 6.

The ramp plate 20 further includes a tapered front edge 32, FIG. 2, at the ramp end 30 of the ramp plate 20. The transverse pivoting rod 50 is preferably welded or bolted to the lower surface 24 of the ramp plate 20, the ramp plate 20 and transverse pivoting rod 50 being mate of a sturdy metal. The upper surface 22 of the ramp plate 20 may be slightly arced, entirely flat or slightly concave. It may also be preferred to attach the transverse pivoting rod 50 on the lower surface 24 closer to the locking end 40 than the ramp end 30, overbalancing the ramp plate 20 causing it to be lower on the ramp end 30 than the locking end 40.

Installation of the pivotal pin lock 10 to the fifth wheel hitch 100 would involve first boring holes 108 in opposing side plates 104 within the opening 102 of the fifth wheel hitch 100, shown assembled in FIG. 1 of the drawings. These holes 108 would be adapted to receive the two extending pivot arms 55 of the transverse pivoting rod 50, allowing the transverse pivoting rod 50 to pivot freely within the holes 108. Other pivotal connections between the side plates 104 of the fifth wheel hitch 100 and the transverse pivoting rod 50 may also be presented, so long as the transverse pivoting rod 50 is not incidentally displaced from the side plates 104 of the fifth wheel hitch 100.

While the invention has been particularly shown and described with reference to a preferred embodiment thereof, it will be understood by those skilled in the art that changes in form and detail may be made therein without departing from the spirit and scope of the invention.

What is claimed is:

1. A pivotal pin lock presented as an improvement to a fifth wheel hitch receiving a kingpin from a fifth wheel trailer, said fifth wheel hitch having an opening, two side plates, and a kingpin locking mechanism, said pivotal pin lock adapted to pivotally engage said side plates within said opening of said fifth wheel hitch, said pivotal pin lock comprising:

a ramp plate having a weighted ramp end, a locking end, an upper surface and a lower surface; and a transverse pivoting rod attached to said lower surface of said ramp plate, said transverse pivoting rod further forming two extending pivot arms, said pivot arms pivotally engaging said side plates in said opening of said fifth wheel hitch, said locking end of said ramp plate directed towards said kingpin locking mechanism of said fifth wheel hitch, said ramp end presented lower within said opening of said fifth wheel hitch than said locking end, said locking end blocking release of said kingpin in said opening once said kingpin has passed over said upper surface of said ramp plate in said opening.

2. The pivotal pin lock as disclosed in claim 1 wherein:

said kingpin makes first contact with a tapered edge of said ramp end of said ramp plate upon said upper surface, said kingpin continuing over said upper surface until said kingpin moves onto said locking end, said kingpin tipping said ramp plate, pivotally lowering said locking end and raising said ramp end, said kingpin passing said locking end of said ramp plate, depositing said kingpin into said kingpin locking mechanism of said fifth wheel hitch, said ramp plate pivotally returning to where said ramp end is again lower than said locking end, said locking end blocking said kingpin from being removed from said opening past said ramp plate unless said kingpin is raised out of said opening.

3. The pivotal pin lock, as disclosed in claim 1 wherein said pivot arms are pivotally engaged with said side plates in said opening of said fifth wheel hitch by the process of:

boring aligned holes in each said side plate; and inserting each said pivot arm within said hole in each said side plate, allowing said transverse pivoting rod attached to said ramp plate to pivot freely within said opening.

* * * * *